United States Patent
Suga et al.

(10) Patent No.: US 10,147,949 B2
(45) Date of Patent: Dec. 4, 2018

(54) NEGATIVE ELECTRODE MATERIAL FOR LITHIUM ION BATTERY

(71) Applicant: Automotive Energy Supply Corporation, Zama-shi, Kanagawa (JP)

(72) Inventors: Sohei Suga, Zama (JP); Koichi Shinohara, Zama (JP); Kenji Ohara, Zama (JP); Toshihiro Horiuchi, Zama (JP); Masanori Aoyagi, Zama (JP); Junko Nishiyama, Zama (JP)

(73) Assignee: Automotive Energy Supply Corporation, Zama-Shi, Kanagawa (JP)

( * ) Notice: Subject to any disclaimer, the term of this patent is extended or adjusted under 35 U.S.C. 154(b) by 68 days.

(21) Appl. No.: 14/966,332

(22) Filed: Dec. 11, 2015

(65) Prior Publication Data
US 2016/0181614 A1 Jun. 23, 2016

(30) Foreign Application Priority Data

Dec. 18, 2014 (JP) ................................ 2014-256330

(51) Int. Cl.

| | |
|---|---|
| *H01M 4/587* | (2010.01) |
| *H01M 4/36* | (2006.01) |
| *H01M 10/0525* | (2010.01) |
| *H01M 4/02* | (2006.01) |
| *H01M 4/505* | (2010.01) |
| *H01M 4/525* | (2010.01) |

(52) U.S. Cl.
CPC ........... *H01M 4/587* (2013.01); *H01M 4/364* (2013.01); *H01M 10/0525* (2013.01); *H01M 4/505* (2013.01); *H01M 4/525* (2013.01); *H01M 2004/027* (2013.01); *H01M 2220/20* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 6,132,906 | A * | 10/2000 | Nishimura | ............ H01M 4/581 429/324 |
| 2002/0086210 | A1 * | 7/2002 | Naruoka | ................ C01G 51/42 429/223 |
| 2012/0009452 | A1 * | 1/2012 | Ueda | ........................ H01M 4/13 429/94 |

FOREIGN PATENT DOCUMENTS

JP 2011-054371 A 3/2011

OTHER PUBLICATIONS

European Search Report dated Feb. 24, 2016, issued in corresponding Application No. 15200527.8.

* cited by examiner

Primary Examiner — Wojciech Haske
(74) Attorney, Agent, or Firm — Troutman Sanders LLP

(57) ABSTRACT

A negative electrode material for a lithium ion battery according to an embodiment of the present disclosure includes graphite particles and amorphous carbon particles. The graphite particles have a median diameter (D50) A of 8.0 μm or more and 11.0 μm or less. A ratio A/B of the median diameter A (μm) to a median diameter (D50) B (μm) of the amorphous carbon particles satisfies a relation of $1.1 < (A/B) \leq 2.75$.

6 Claims, 1 Drawing Sheet

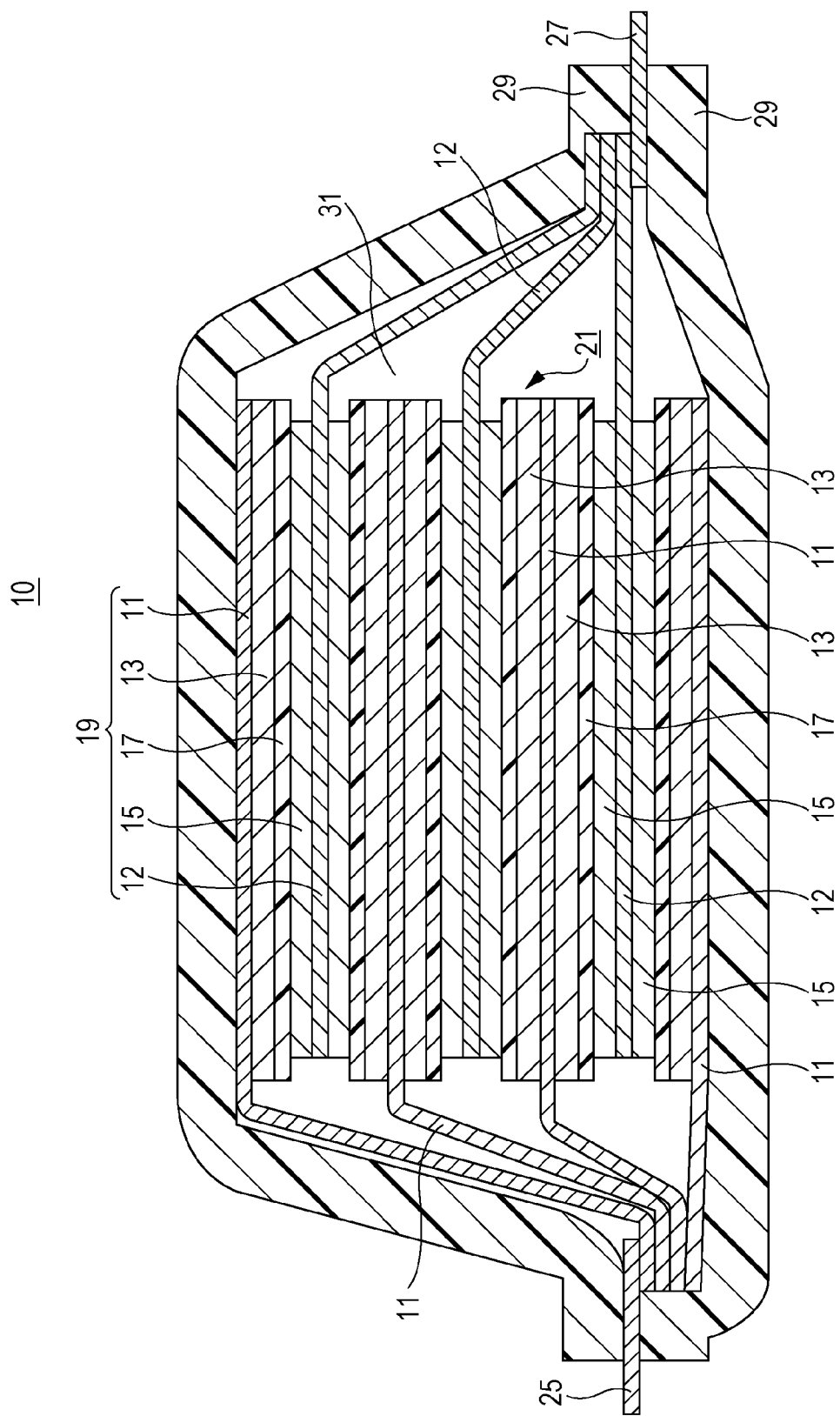

NEGATIVE ELECTRODE MATERIAL FOR LITHIUM ION BATTERY

CROSS-REFERENCE TO RELATED APPLICATION

This application claims priority from Japanese Patent Application No. 2014-256330 filed with the Japan Patent Office on Dec. 18, 2014, the entire content of which is hereby incorporated by reference.

BACKGROUND

1. Technical Field

The present disclosure relates to a mixed electrode material for a nonaqueous electrolyte battery, and more particularly to a negative electrode material for a lithium ion battery and a lithium ion battery.

2. Related Art

Nonaqueous electrolyte batteries have been put into practical use as batteries for vehicles including hybrid vehicles and electric vehicles. As such nonaqueous electrolyte batteries for the on-vehicle power source, lithium ion secondary batteries have been desired to have higher energy density, excellent input and output characteristics, and longer life. For improving the acceleration performance at the start of a vehicle, in particular, it is important to increase the output of the lithium ion secondary battery.

Carbon materials are used as the negative electrode material for a lithium ion battery. For improving the output characteristic of the lithium ion battery, the material obtained by mixing graphite and amorphous carbon at a predetermined ratio is used (JP-A-2011-54371). According to JP-A-2011-54371, the lower output at the end stage of the discharge can be suppressed because the graphite material can maintain higher battery voltage than the amorphous carbon material, and thereby, the battery can have a higher output characteristic by the use of the material obtained by mixing the graphite material and the amorphous carbon material. JP-A-2011-54371 discloses examples of the graphite material and the amorphous carbon material with the characteristics applicable to the mixed negative electrode material.

SUMMARY

A negative electrode material for a lithium ion battery according to an embodiment of the present disclosure includes graphite particles and amorphous carbon particles. The graphite particles have a median diameter (D50) A of 8.0 μm or more and 11.0 μm or less. A ratio A/B of the median diameter A (μm) to a median diameter (D50) B (μm) of the amorphous carbon particles satisfies a relation of 1.1<(A/B)≤2.75.

BRIEF DESCRIPTION OF THE DRAWINGS

FIG. 1 is a schematic sectional view illustrating a lithium ion battery including a negative electrode material according to an embodiment of the present disclosure.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The use of the mixed negative electrode material for improving the output characteristic of the battery may cause the mutual reaction between the mixed graphite and non-aqueous electrolyte solution, in which case the electrolyte solution is consumed. This may result in the lower cycle characteristic of the battery. In view of this, an object of the present disclosure is to provide a negative electrode material for a lithium ion battery, which can maintain the cycle characteristic of the battery while maintaining the output characteristic of the battery.

A negative electrode material for a lithium ion battery according to a first embodiment of the present disclosure is a carbon-based negative electrode material containing graphite particles and amorphous carbon particles. The graphite particles have a median diameter (D50) (hereinafter referred to as "median diameter" as appropriate) of 8.0 μm or more and 11.0 μm or less. The ratio A/B of the median diameter A (μm) of the graphite particles to the median diameter B (μm) of the amorphous carbon particles satisfies the relation of 1.1<(A/B)≤2.75.

The graphite employed in the present embodiment is a carbon material with a hexagonal crystal system with a hexagonal plate shape, which is also referred to as black lead or the like. The graphite may have shapes of particles with a median diameter (D50) of 8.0 μm or more and 11.0 μm or less.

A part of the structure of the amorphous carbon used in this embodiment may be similar to the structure of graphite. The amorphous carbon refers to a carbon material that is amorphous as a whole with a network structure including randomly distributed microcrystals. Examples of the amorphous carbon include carbon black, coke, activated carbon, carbon fiber, hard carbon, soft carbon, and mesoporous carbon. The amorphous carbon in the embodiment of the present disclosure may have shapes of particles. The ratio A/B of the median diameter A of the graphite particles to the median diameter B of the amorphous carbon particles may satisfy 1.1<(A/B)≤2.75.

The ratio between the particle sizes of particular graphite particles and particular amorphous carbon particles included in the negative electrode material for a lithium ion battery according to the present disclosure is controlled within a predetermined range. This can reduce the specific surface area of the electrode. As a result, the reaction between the electrode and the nonaqueous electrolyte solution can be suppressed. This can improve the cycle characteristic of the battery while the output characteristic of the battery is maintained.

A negative electrode material for a lithium ion battery according to the present disclosure includes graphite particles and amorphous carbon particles. The graphite particles have a median diameter (D50) A of 8.0 μm or more and 11.0 μm or less. A ratio A/B of the median diameter A (μm) to a median diameter (D50) B (μm) of the amorphous carbon particles satisfies a relation of 1.1<(A/B)≤2.75. The negative electrode material for a lithium ion battery according to the present disclosure includes graphite particles with a median diameter (D50) of 8.0 μm or more and 11.0 μM or less, and amorphous carbon particles with a particular median diameter. The ratio A/B of the median diameter A (μm) of the graphite particles to the median diameter B (μm) of the amorphous carbon particles satisfies the relation of 1.1<(A/B)≤2.75. The lattice plane spacing $d_{002}$ between the (002)

planes of the graphite particles used in this embodiment may be 0.3368 nm or more and 0.3380 nm or less according to the X-ray diffraction method. When the lattice plane spacing $d_{002}$ between (002) planes of the graphite particles according to the X-ray diffraction method is 0.3368 nm or more, the reactivity with propylene carbonate as one component of the nonaqueous electrolyte solution is reduced. This can improve the charging and discharging efficiency of the battery.

The amorphous carbon particles may have a median diameter of 4.5 µM or more and 7.0 µm or less. Both the graphite particles and the amorphous carbon particles expand and contract repeatedly in the charging and discharging cycle of the battery. The expansion of the graphite particles and the amorphous carbon particles may produce the stress on the negative electrode layer, and the stress can have an adverse influence on the electrode layer. On the other hand, it has been known that the amorphous carbon particles are the materials that expand less easily than the graphite particles. In view of this, the amorphous carbon particles with a smaller particle size than the graphite particles to be used are employed so that the stress on the electrode layer, which would be produced by the expansion of the graphite particles, can be relieved.

The graphite particles and the amorphous carbon particles can be mixed by a normal method. For example, these particles can be weighed at a predetermined weight ratio and mixed with the use of a mechanical mixer typified by a ball mill or a mixer. The mixing ratio between the graphite particles and the amorphous carbon particles may be in the range of 95/5 to 70/30 in weight ratio. If the proportion of amorphous carbon particles is too small, the output characteristic of the battery is not improved as desired. If, on the other hand, the proportion of amorphous carbon particles is too large, the battery voltage is decreased when the residual battery (State of Charge, hereinafter referred to as "SOC") is small. This leads to the lower battery output at the lower battery energy, which is disadvantageous. In view of this, the mixing ratio between the graphite particles and the amorphous carbon particles may be approximately 80/20 in weight ratio.

Next, a second embodiment according to the present disclosure is described. A negative electrode for a lithium ion battery according to the second embodiment includes graphite particles and amorphous carbon particles. The graphite particles have a median diameter (D50) of 8.0 µm or more and 11.0 µm or less. The ratio a/b of the specific surface area a (m²/g) of the graphite particles to the specific surface area b (m²/g) of the amorphous carbon particles satisfies the relation of $0.25<(a/b)\leq 0.75$. In other words, the negative electrode material for a lithium ion battery according to this embodiment includes graphite particles with a median diameter (D50) of 8.0 µm or more and 11.0 µm or less and amorphous carbon particles with a particular specific surface area. The ratio a/b of the specific surface area a (m²/g) of the graphite particles to the specific surface area b (m²/g) of the amorphous carbon particles satisfies the relation of $0.25<(a/b)\leq 0.75$. The graphite employed in this embodiment may have shapes of particles. The median diameter (D50) in the particle size distribution may be 8.0 µm or more and 11.0 µm or less. The lattice plane spacing $d_{002}$ between the (002) planes of the graphite particles according to the X-ray diffraction may be 0.3368 nm or more and 0.3380 nm or less. When the lattice plane spacing $d_{002}$ between the (002) planes of the graphite particles according to the X-ray diffraction method is 0.3368 nm or more, the reactivity with propylene carbonate as one component of the nonaqueous electrolyte solution is reduced. This can improve the charging and discharging efficiency of the battery.

The amorphous carbon according to this embodiment may have shape of particles. The ratio a/b of the specific surface area a of the graphite particles to the specific surface area b of the amorphous carbon particles may satisfy the relation of $0.25<(a/b)\leq 0.75$. The specific surface area refers to the BET specific surface area measured by the BET method. As the particles have a larger specific surface area, the particles are smaller. The median diameter (D50) of the amorphous carbon particles used in this embodiment may be 4.5 µm or more and 7.0 µm or less. The use of the amorphous carbon particles with a smaller diameter than the graphite particles to be used can relieve the stress on the electrode layer, which would be produced by the expansion of the graphite particles.

In this embodiment, the graphite particles and the amorphous carbon particles can be mixed using a mechanical mixer typified by a ball mill or a mixer. The mixing ratio between the graphite particles to the amorphous carbon particles may be in the range of 95/5 to 70/30, particularly 80/20 in weight ratio.

The ratio of the specific surface area of particular graphite particles to the specific surface area of particular amorphous carbon particles included in the negative electrode for a lithium ion battery according to this embodiment is controlled to be in a predetermined range. This can reduce the specific surface area of the electrode while the output characteristic of the battery is maintained. Accordingly, the reaction between the electrode and the nonaqueous electrolyte solution can be suppressed, thereby improving the battery cycle characteristic.

Next, a third embodiment of the present disclosure is described. The third embodiment is related to a lithium ion battery including a negative electrode with the negative electrode material according to the first or second embodiment used as a negative electrode active material, and a positive electrode with a lithium nickel cobalt manganese composite oxide used as a positive electrode active material. The positive electrode active material used in this embodiment is a lithium nickel cobalt manganese composite oxide. The lithium nickel cobalt manganese composite oxide is represented by a general formula $Li_xNi_yMn_zCo_{(1-y-z-w)}A_wO_2$ and has a layer crystal structure. In the general formula, x satisfies $0<x<1.2$ and y and z are positive numerals satisfying $y+z<1$. Containing more manganese makes it less easy to synthesize the composite oxide with a single phase. For this reason, $z\leq 0.4$ may be satisfied. Further, containing more cobalt leads to higher cost and lower capacity. For this reason, $1-y-z<y$ and $1-y-z<z$ may be satisfied. For obtaining the battery with high capacity, $y>z$ and $y>1-y-z$ may be satisfied. In the general formula, A represents at least one element of Ni, Mn, and Co whose part may be replaced or doped with at least one of Li, Al, Cr, Mg, Ti, B, F, and W. Moreover, $0\leq w<0.01$ may be satisfied. In other words, the proportion of the element A that is replaced or doped constitutes less than 1 mol %. The lithium nickel cobalt manganese composite oxide used in this embodiment may have a median diameter (D50) of 4.5 µM or more and 7.5 µM or less and a specific surface area of 0.6 m²/g or more and 1.1 m²/g or less. The use of the lithium nickel cobalt manganese composite oxide as the positive electrode active material enables the battery to have an average operation voltage range with the well-balanced upper limit voltage and lower limit voltage. This improves the input and output characteristics of the battery.

According to the embodiment, a ratio of the median diameter (μm) of the graphite particles to a battery capacity (Ah) is 1.3 to 2.5 μm/Ah. A ratio of the specific surface area (m²/g) of the graphite particles to the battery capacity (Ah) is 0.35 to 0.75 (m²/g·Ah). A ratio of a median diameter (μm) of the amorphous carbon particles to the battery capacity (Ah) is 0.7 to 1.6 μm/Ah. A ratio of the specific surface area (m²/g) of the amorphous carbon particles to the battery capacity (Ah) is 0.75 to 1.70 (m²/g·Ah). Using the graphite particles and the amorphous carbon particles in combination enables the battery to have lower internal resistance. This can expand the application of the battery.

The negative electrode active material and the positive electrode active material as above are applied or rolled on a current collector such as a metal foil. The negative electrode active material and the positive electrode active material are then dried to form the negative electrode and the positive electrode, respectively. On this occasion, an addition that is normally used for forming an electrode, such as a binder, a conductive auxiliary agent, a thickener, a dispersant, or a stabilizer, can be used. The appropriate negative electrode and positive electrode can be formed in this manner.

The lithium ion battery including the negative electrode material according to this embodiment can employ the nonaqueous electrolyte solution. Examples of the nonaqueous electrolyte solution include a solution which is produced by one or more lithium salts selected from lithium hexafluorophosphate ($LiPF_6$), lithium tetrafluoroborate ($LiBF_4$), and lithium perchlorate ($LiClO_4$) being dissolved in a mixture solvent of one or more organic solvents selected from cyclic carbonates such as propylene carbonate and ethylene carbonate, and linear carbonates such as dimethyl carbonate, diethyl carbonate, and ethylmethyl carbonate.

The lithium ion battery including the negative electrode material according to this embodiment can employ a separator to secure conductivity of lithium ions between the separated negative electrode and positive electrode. The separator may be a porous film or a microporous film of polyolefins.

A structure example of the lithium ion battery including the negative electrode material according to this embodiment is described with reference to a drawing. FIG. 1 is an example of a sectional view of a lithium ion battery. A lithium ion battery 10 includes a negative electrode current collector 11, a negative electrode active material layer 13, a separator 17, a positive electrode current collector 12, and a positive electrode active material layer 15 as main components. In FIG. 1, the negative electrode active material layer 13 is provided on each surface of the negative electrode current collector 11, and the positive electrode active material layer 15 is provided on each surface of the positive electrode current collector 12. The active material layer may alternatively be provided on just one surface of each current collector. The negative electrode current collector 11, the positive electrode current collector 12, the negative electrode active material layer 13, the positive electrode active material layer 15, and the separator 17 constitute one battery unit (unit cell 19 in the FIGURE). A plurality of unit cells 19 is stacked on each other with the separator 17 interposed therebetween. Extension portions extending from the negative electrode current collectors 11 are bonded onto a negative electrode lead 25 collectively. Extension portions extending from the positive electrode current collectors 12 are bonded onto a positive electrode lead 27 collectively. The battery formed by the stacked unit cells is packaged by an exterior body 29. At this time, the negative electrode lead 25 and the positive electrode lead 27 are led out of the exterior body 29. The inside of the exterior body 29 is filled with electrolyte solution 31.

EXAMPLES

<Fabrication of Negative Electrode>

The graphite powder and the amorphous carbon powder with the median diameters and the specific surface areas expressed in Table 1 were mixed at 80:20 (weight ratio) and the negative electrode active material, which was obtained thereby, was used. The mixed materials, polyvinylidene fluoride as a binder, and carbon black powder as a conductive auxiliary agent were added to N-methyl-2-pyrrolidine (hereinafter referred to as "NMP") at a solid content mass ratio of 92:6:2. By stirring the obtained mixture, these materials were uniformly dispersed in NMP to prepare slurry. The obtained slurry was applied onto an 8-μm-thick copper foil, which would serve as a negative electrode current collector. Next, the slurry was heated for 10 minutes at 125° C. to evaporate NMP, thereby forming the negative electrode active material layer. In addition, the negative electrode active material layer was pressed, thereby fabricating the negative electrode with the negative electrode active material layer applied on one surface of the negative electrode current collector.

<Fabrication of Positive Electrode>

Lithium-nickel-cobalt-lithium manganate (NCM433, nickel:cobalt:manganese=4:3:3, lithium:nickel=1:0.4, median diameter=5.0 μm, specific surface area=0.9 m²/g) as the positive electrode active material, polyvinylidene fluoride as a binder resin, and carbon black powder as a conductive auxiliary agent were added to NMP as a solvent at a solid content mass ratio of 88:8:4. Then, to 100 parts by mass of the solid content obtained by subtracting NMP from the mixture, 0.03 parts by mass of oxalic anhydride (molecular weight: 90) as an organic moisture scavenger was added in the mixture. By stirring the obtained mixture, the materials were uniformly dispersed to prepare slurry. The obtained slurry was applied onto a 15-μm-thick aluminum foil, which would serve as a positive electrode current collector. Next, the slurry was heated for 10 minutes at 125° C. to evaporate NMP, thereby forming the positive electrode active material layer. In addition, the positive electrode active material layer was pressed, thereby fabricating the positive electrode with the positive electrode active material layer applied on one surface of the positive electrode current collector.

<Fabrication of Lithium Ion Secondary Battery>

A plurality of negative electrodes and a plurality of positive electrodes were cut out of the negative electrodes and the positive electrodes fabricated as above. An uncoated portion used for connecting a terminal was welded using ultrasonic waves to a positive electrode terminal made of aluminum. Similarly, an uncoated portion of the negative electrode was welded using ultrasonic waves to a negative electrode terminal made of nickel, which has the same size as the positive electrode terminal. The negative electrode was disposed on one surface of the separator made of polypropylene and the positive electrode was disposed on the other surface thereof, in a manner that the negative electrode active material layer and the positive electrode active material layer were stacked with the separator interposed therebetween. This provides the electrode multilayer body. Three sides of the two aluminum laminated films, except one long side thereof, were attached to each other by thermal sealing. This produced a bag-shaped laminated exterior body. The electrode multilayer body was inserted into the laminated exterior body. The nonaqueous electrolyte solution was poured so that the body was impregnated with the electrolyte solution in vacuum. After that, the opening was sealed thermally under reduced pressure, thereby providing a stacked lithium ion battery. By performing the high-temperature aging on the stacked lithium ion battery several times, a stacked lithium ion battery with a battery capacity of 5 Ah was obtained.

For preparing the nonaqueous electrolyte solution, first, a nonaqueous solvent was obtained by mixing propylene carbonate (hereinafter referred to as "PC"), ethylene carbonate (hereinafter referred to as "EC"), and diethyl carbonate (hereinafter referred to as "DEC") at a ratio of PC:EC:DEC=5:25:70 (volume ratio). Lithium hexafluorophosphate ($LiPF_6$) as the electrolyte salt was dissolved in this nonaqueous solvent so that the concentration became 0.9 mol/L, thereby providing the nonaqueous solution. To this nonaqueous solution, linear disulfonate (methylene methane disulfonate (MMDS)) and vinylene carbonate as addition were dissolved so that the concentration became 1 wt. %, thereby providing the nonaqueous electrolyte solution for batteries.

<Measurement of Initial Performance of Lithium Ion Battery>

The stacked lithium ion battery fabricated as above was charged and discharged for one cycle under the condition of a temperature of 25° C., CCCV charging (two hours) until an end-of-charge voltage of 4.2 V and discharging until an end-of-discharge voltage of 3.0 V. From this charging and discharging cycle, the charging capacity and discharging capacity were calculated. The ratio between the charging capacity and the discharging capacity was obtained as the initial charging and discharging efficiency. The battery with an SOC of 50% was discharged at a constant current of 10 A for five seconds using a charging and discharging device. After that, the initial battery resistance of this battery was measured. Table shows the values of the initial battery resistance in Examples expressed in percentage, as compared to the value of the initial battery resistance according to Example 1 assumed as 100%.

<Measurement of Charging and Discharging Efficiency of Lithium Ion Battery>

The stacked lithium ion battery fabricated as above was charged under a condition of CCCV charging with a charging rate of 0.2 C and an end-of-charge voltage of 4.2 V. Next, the battery was discharged under a condition of a discharging rate of 0.2 C and an end-of-discharge voltage of 3.0 V. (Note that 1-C current of the charging refers to the charging current where it takes an hour to increase the value of the SOC of the battery from 0% to 100%. The 1-C current of the discharging refers to the discharging current where it takes an hour to decrease the value of the SOC of the battery from 100% to 0%. This applies similarly to the description below.) The charging and discharging efficiency was obtained as the ratio between the charging capacity and the discharging capacity obtained by the charging and discharging under the above condition.

<Cycle Characteristic Test>

The stacked lithium ion battery fabricated as above was charged and discharged repeatedly at 1-C current with a battery voltage between 4.2 V and 3 V under the environment of 55° C. for a month. The capacity retention was calculated by a formula (battery capacity after 1-month cycle)/(initial battery capacity). The resistance increase ratio was calculated by a formula (resistance value after 1-month cycle)/(initial battery resistance value).

Examples 1 to 7 and Comparative Examples 1 to 5

The graphite particles with various median diameters and specific surface areas were mixed with the amorphous carbon particles with various median diameters and specific surface areas according to the aforementioned method, thereby preparing the negative electrode active material. The negative electrode fabricated using the negative electrode active material was combined with the positive electrode fabricated by the aforementioned method, thereby fabricating the stacked lithium ion battery. The results of evaluating the characteristics of the stacked lithium ion battery are shown in Table 1.

TABLE 1

Properties for graphite and amorphous carbon and battery characteristic

| | Graphite | | | Amorphous carbon | | Ratio | | |
|---|---|---|---|---|---|---|---|---|
| | D50 Particle size (A) (μm) | Specific surface area (a) ($m^2$/g) | $D_{002}$ | D50 Particle size (B) (μm) | Specific surface area (b) ($m^2$/g) | A/B | a/b | A/Battery capacity |
| Example 1 | 11 | 2 | 0.3370 | 4.5 | 7 | 2.44 | 0.29 | 2.20 |
| Example 2 | 9.5 | 2.5 | 0.3368 | 5.5 | 5.5 | 1.73 | 0.45 | 1.90 |
| Example 3 | 8 | 3 | 0.3368 | 7 | 4 | 1.14 | 0.75 | 1.60 |
| Example 4 | 11 | 2 | 0.3374 | 4 | 8 | 2.75 | 0.25 | 2.20 |
| Example 5 | 11 | 2 | 0.3370 | 4.5 | 9.5 | 2.44 | 0.21 | 2.20 |
| Example 6 | 11 | 2 | 0.3370 | 9 | 3.6 | 1.22 | 0.56 | 2.20 |
| Example 7 | 5.6 | 4.1 | 0.3380 | 4.5 | 9.5 | 1.24 | 0.43 | 1.12 |
| Comparative Example 1 | 11 | 2 | 0.3370 | 11 | 2 | 1.00 | 1.00 | 2.20 |
| Comparative Example 2 | 7 | 3.5 | 0.3368 | 7 | 4 | 1.00 | 0.88 | 1.40 |
| Comparative Example 3 | 14 | 1.6 | 0.3380 | 4 | 8 | 3.50 | 0.20 | 2.80 |
| Comparative Example 4 | 11 | 2 | 0.3368 | 3.2 | 10.1 | 3.44 | 0.20 | 2.20 |
| Comparative Example 5 | 11 | 2 | 0.3363 | 3.2 | 10.1 | 3.44 | 0.20 | 2.20 |

TABLE 1-continued

Properties for graphite and amorphous carbon and battery characteristic

|  | Ratio | | | Initial characteristic | | Durability | |
|---|---|---|---|---|---|---|---|
|  | a/Battery capacity | B/Battery capacity | b/Battery capacity | Charging and discharging efficiency (%) | Battery resistance (Compared to Example 1) (%) | Capacity retention (%) | Resistance increase ratio (%) |
| Example 1 | 0.40 | 0.90 | 1.40 | 92 | 100 | 85 | 115 |
| Example 2 | 0.50 | 1.10 | 1.10 | 91 | 100 | 88 | 112 |
| Example 3 | 0.60 | 1.401 | 0.80 | 92 | 100 | 87 | 113 |
| Example 4 | 0.40 | 0.80 | 1.60 | 91 | 95 | 81 | 124 |
| Example 5 | 0.40 | 0.90 | 1.90 | 91 | 90 | 80 | 123 |
| Example 6 | 0.40 | 1.80 | 0.72 | 91 | 120 | 85 | 118 |
| Example 7 | 0.82 | 0.90 | 1.90 | 92 | 123 | 82 | 118 |
| Comparative Example 1 | 0.40 | 2.20 | 0.40 | 91 | 135 | 75 | 127 |
| Comparative Example 2 | 0.70 | 1.40 | 0.80 | 91 | 125 | 78 | 125 |
| Comparative Example 3 | 0.32 | 0.80 | 1.60 | 92 | 135 | 83 | 120 |
| Comparative Example 4 | 0.40 | 0.64 | 2.02 | 92 | 130 | 79 | 120 |
| Comparative Example 5 | 0.40 | 0.64 | 2.02 | 83 | 100 | 70 | 130 |

The lithium ion battery including the negative electrode material according to the present disclosure has the excellent initial characteristic and durability. In particular, the capacity retention after the 1-month cycle test is 80% or more if the negative electrode material according to the present disclosure is used. The capacity retention is particularly high and the resistance increase ratio is small if the ratio A/B of the particle size of the graphite particles to the particle size of the amorphous carbon particles satisfies the range defined in the first embodiment of the present disclosure and moreover if the specific surface area ratio a/b satisfies the range defined in the second embodiment of the present disclosure (Examples 1, 2, 3, 6, and 7). This is because of the following reasons. The carbon material used as the negative electrode active material intercalates and deintercalates lithium ions during the charging and discharging of the lithium ion battery. On this occasion, the carbon material expands and/or contracts. It is known that the graphite expands more than the amorphous carbon. The large expansion and/or contraction of the carbon material produces the stress on the negative electrode active material layer, which may adversely affect the electrode layer. The stress distortion in the charging and discharging can be minimized by using the mixed graphite and amorphous carbon as the negative electrode material with the appropriately balanced particle sizes and specific surface areas. According to the present disclosure, the balance between the particle size of the graphite particles and the particle size of the amorphous carbon particles in the mixed carbon material of the graphite and the amorphous carbon, and the balance between the specific surface area of the graphite particles and the specific surface area of the amorphous carbon particles can be set to be within the appropriate range. The negative electrode material according to the present disclosure can reduce the stress distortion in the charging and discharging. This can suppress the destruction of the negative electrode active material layer. Accordingly, the durability of the battery can be improved.

The description has been made of Examples of the present disclosure but the above Examples merely illustrate examples of the present disclosure and do not limit the present disclosure to the specific structure of the embodiment with the technical range according to the present disclosure. The negative electrode material for a lithium ion battery according to the embodiment of the present disclosure may be any of the following first to fourth negative electrode materials.

The first negative electrode material is a carbon-based negative electrode material containing graphite particles and amorphous carbon particles. The graphite particles have a median diameter (D50) of 8.0 μm or more and 11.0 μm or less. The amorphous carbon particles have a particle size distribution with the ratio A/B of the median diameter A (μm) of the graphite particles to the median diameter B (μm) of the amorphous carbon particles satisfying the relation of $1.1 < (A/B) \leq 2.75$.

The second negative electrode material is a carbon-based negative electrode material containing graphite particles and amorphous carbon particles. The graphite particles have a median diameter (D50) of 8.0 μm or more and 11.0 μm or less. The amorphous carbon particles have a specific surface area with the ratio a/b of the specific surface area a (m²/g) of the graphite particles to the specific surface area b (m²/g) of the amorphous carbon particles satisfying the relation of $0.25 < (a/b) \leq 0.75$.

In the third negative electrode material according to the first or second negative electrode material, the lattice plane spacing $d_{002}$ between the (002) planes of the graphite particles according to an X-ray diffraction method is 0.3368 nm or more and 0.3380 nm or less.

In the fourth negative electrode material according to the first or second negative electrode material, the amorphous carbon particles have a median diameter of 4.5 μm or more and 7.0 μm or less.

The lithium ion battery according to the embodiment of the present disclosure may be any of the following first to third lithium ion batteries.

The first lithium ion battery includes at least: a negative electrode including any of the first to fourth negative electrode materials as a negative electrode active material; and a positive electrode including a lithium nickel cobalt manganese composite oxide as a positive electrode active material.

In the second lithium ion battery according to the first lithium ion battery, the lithium nickel cobalt manganese composite oxide has a median diameter (D50) of 4.5 µm or more and 7.5 µm or less and a specific surface area of 0.6 m$^2$/g or more and 1.1 m$^2$/g or less.

In the third lithium ion battery according to the first or second lithium ion battery, the ratio of the median diameter of the graphite particles to battery capacity is 1.3 to 2.5 µm/Ah. The ratio of the specific surface area of the graphite particles to the battery capacity is 0.35 to 0.75. The ratio of the median diameter of the amorphous carbon particles to the battery capacity is 0.7 to 1.6 µm/Ah. The ratio of the specific surface area of the amorphous carbon particles to the battery capacity is 0.75 to 1.70.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A negative electrode material for a lithium ion battery, comprising graphite particles and amorphous carbon particles, wherein:
   the graphite particles have a median diameter (D50) of 8.0 µm or more and 9.5 µm or less;
   the amorphous carbon particle has a median diameter (D50) of 4.5 µm or more and 7.0 µm or less; and
   a ratio of the graphite particles to the amorphous carbon particles by weight is between 70/30 and 95/5.

2. The negative electrode material according to claim 1, wherein a lattice plane spacing $d_{002}$ between (002) planes of the graphite particles according to an X-ray diffraction method is 0.3368 nm or more and 0.3380 nm or less.

3. A lithium ion battery comprising:
   a negative electrode including the negative electrode material according to claim 1 as a negative electrode active material; and
   a positive electrode including a lithium nickel cobalt manganese composite oxide as a positive electrode active material.

4. The lithium ion battery according to claim 3, wherein the lithium nickel cobalt manganese composite oxide has a median diameter (D50) of 4.5 µm or more and 7.5 µm or less and a specific surface area of 0.6 m$^2$/g or more and 1.1 m$^2$/g or less.

5. The lithium ion battery according to claim 3, wherein:
   a ratio of the median diameter (µm) of the graphite particle to a battery capacity (Ah) is 1.3 to 2.5 µm/Ah;
   a ratio of the specific surface area (m$^2$/g) of the graphite particle to the battery capacity (Ah) is 0.35 to 0.75 (m$^2$/g·Ah);
   a ratio of a median diameter (µm) of the amorphous carbon particle to the battery capacity (Ah) is 0.7 to 1.6 µm/Ah; and
   a ratio of the specific surface area (m$^2$/g) of the amorphous carbon particle to the battery capacity (Ah) is 0.75 to 1.70 (m$^2$/g·Ah).

6. The negative electrode material according to claim 1, wherein the ratio of the graphite particles to the amorphous carbon particles by weight is 80/20.

* * * * *